United States Patent [19]

Breach et al.

[11] Patent Number: 4,575,522

[45] Date of Patent: Mar. 11, 1986

[54] RUBBER COMPOSITION FOR GEOTHERMAL APPLICATION

[75] Inventors: William D. Breach, Humble; Edwin W. Vaclavik, Houston, both of Tex.

[73] Assignee: Hydril Company, Houston, Tex.

[21] Appl. No.: 709,514

[22] Filed: Mar. 7, 1985

[51] Int. Cl.$^4$ .......................... C08K 3/04; C08K 5/13; C08J 3/24
[52] U.S. Cl. .................................. 523/220; 524/496; 524/530; 524/581
[58] Field of Search ............... 523/220; 524/581, 496, 524/530

[56] References Cited

U.S. PATENT DOCUMENTS

| | | | |
|---|---|---|---|
| 3,243,405 | 3/1966 | Boyer et al. | 524/581 |
| 3,305,517 | 2/1967 | Kehr | 524/581 |
| 3,931,097 | 1/1976 | Fujio et al. | 524/88 |
| 4,526,707 | 7/1985 | Kutsuwa et al. | 524/496 |

FOREIGN PATENT DOCUMENTS

| | | |
|---|---|---|
| 044245 | 4/1975 | Japan . |
| 107504 | 7/1982 | Japan . |
| 804662 | 2/1981 | U.S.S.R. . |

*Primary Examiner*—Herbert J. Lilling
*Attorney, Agent, or Firm*—Vaden, Eickenroht, Thompson & Jamison

[57] ABSTRACT

A composition for use in geothermal or high temperature and steam applications of ethylene-propylene copolymer with peroxide generated carbon to carbon crosslinkage. Effective amounts of antioxidants, carbon black, lubricant, thermal stabilizer and aid to peroxide crosslinkage is added. An antioxidant and thermal stabilizer system is used to produce a product with unusual thermal stability characteristics. The composition also has a mixture of high and low particle size carbon black which act as an antioxidant and reinforcing system. The composition can be used for rubber components in geothermal drilling for pipe protectors, valve seals and other products which are exposed to a high temperature and steam saturated environment.

16 Claims, No Drawings

RUBBER COMPOSITION FOR GEOTHERMAL APPLICATION

BACKGROUND OF THE INVENTION

1. Field of the Invention

This invention is a copolymer composition that has an unusual and superior hydrolytic and thermal stability for use in a geothermal or other environment with high temperature and steam. The high temperature is often accompanied by brine or saturated salt solution of magnesium, sodium, calcium, bromine and other elements which degrade rubber products under these conditions. The composition contains carbon to carbon crosslinkage between the copolymer chains generated by a peroxide curing agent. The copolymer has superior crosslinkage efficiency which gives a higher tensile strength and modulus. The composition cam be made with a viscosity usable for transfer and compression molding of products. The products of the composition, such as pipe protectors and valve seals, have a longer life under the extreme conditions of geothermal service.

2. Description of the Prior Art

There has been a need for rubber or polymer formulations for use in geothermal or high temperature and steam applications. Natural and synthetic rubber have been stabilized by sulfur crosslinkage vulcanization. The polymer chains are crosslinked by one or more sulfur atoms bridging the chains. Under extreme heat and steam encountered in a geothermal system, sulfur vulcanized rubber tends to break down. The rubber becomes inelastic, brittle and does not perform adequately. The life of rubber parts can be only a few days in equipment for geothermal wells given the temperature conditions rising to 600° F. with steam. With such a short effective life there is obviously high expense in replacing the rubber parts as well as down time and field personnel costs. A more stable rubber product has been sought to lengthen replacement time for rubber parts, as well as a rubber which has the resilience, tensile strength and resistance to abrasion for use in the geothermal type environment.

The need for a more stable rubber or polymer under high temperature and steam led to a search for a more stable rubber composition. The U.S. Department of Energy, as part of its project to develop alternative energy sources, explored the use of geothermal wells. During this investigation the need for an improved rubber material for seals and other rubber parts for geothermal applications was recognized. The Department of Energy contracted with L'Garde, Inc. of Newport Beach to develop a formulation which was designated L'Garde Compound Y267. A typical formulation of the L'Garde composition includes a terpolymer of ethylene-propylene-hexadiene marketed under the trademark Nordel 1660 by DuPont Elastomer Division of Wilmington, Delaware and a coagent polymer of 1-2 polybutadiene at 20 parts per 100 parts of the Nordel 1660 terpolymer. A dicumyl peroxide such as Dicup R, a trademark of Hercules, Inc. of Wilmington, Del., in 3.5 parts per 100 parts of rubber is used to effect carbon-carbon crosslinkage. However, the use of the terpolymer and polybutadiene produces a network of crosslinkage that includes a bond with a branch group on the polymer chain or linkage with the coagent which is not part of a uniform polymer chain. Also, the terpolymer used has a high diene content which promotes a faster cure and this usage is contrary to the accepted standards that a lower diene ages better. This type of crosslinkage is not as stable as a uniform crosslinkage between the backbones of the polymer chains without branch groups.

The L'Garde formulation also includes a halogenated hydrocarbon, chlorosulfonated polyethylene, under the trade mark Hypalon 20, a DuPont product at 5 parts per hundred of the terpolymer and antimony oxide Thermoguard S a product of M&T Chemicals, Rahway, N.J., at 5 parts per hundred of terpolymer. Antioxidant 2246 (2,2'-methylene-bis(4-methyl-6-t-butyl phenol) an American Cyanamide product is used in a very low amount of 0.50 parts per hundred of terpolymer. The carbon black is an ASTM N100 type at 75 parts per hundred of the terpolymer.

The L'Garde composition has other drawbacks in addition to the lack of uniform crosslinking between carbon chains. The halogenated hydrocarbon is not recommended for usage in steam service much less geothermal service. The compound increases water absorption and may cause blistering in steam. The L'Garde formula contains a very low level of anitoxidant which effectiveness is relative to the level in the rubber. The coagent, 1-2butadiene, used by L'Garde causes the rubber to be hard and inelastic. This quality narrows the uses of the composition which require elasticity such as pipe protectors.

An improvement of the L'Garde Y267 was developed by Parker Seals of Culver City, Calif., Product No. E962-85. Although there is test data available, the compound formula E962-85 is not disclosed. From the test results Parker Seals finds the E962-85 superior to L'Garde Y267. However, after 168 hours in steam at 600° F., the compound lost 78% of its tensile strength.

The areas of use of an ethylene and propylene copolymer which cannot be sulfur crosslinked are electrical insulation, automotive applications, plastics modification, and electrical cable and connectors. Vistalon 404 is an Exxon Chemical America's trademark for a copolymer which is a 40±5% ethylene and propylene 60±5% product. A typical Exxon formulation using Vistalon 404 for use in the electrical insulation area includes peroxide coagent cure of 40% dicumyl peroxide and coagent TAC-75, a trade name product of Wyrough & Loser, which is a 75% dispersion of triallyl cyanurate. The formulation of the Exxon example have high water absorbency. Also, the composition favors conductivity while sacrificing processability and strength properties for producing products for use in geothermal service. The amount of antioxidant used is not large enough for geothermal protection and the TAC-75 coagent is not suitable for molds because it can cause sticking and premature vulcanization. The uses of the ethylene propylene copolymer for the drilling applications has not been identified.

SUMMARY OF THE INVENTION

The present invention is a superior copolymer composition which can withstand the extreme temperatures and steam in a geothermal environment for a time period longer than prior formulations for geothermal use. The temperature range of the geothermal conditions is generally between 250°–400° F., but can rise to 600° F. The present compound has performed in service with temperatures up to 600° F. in steam for two weeks without any recognizable deterioration. The ethylene and propylene copolymer exhibits superior thermal and hydrolytic stability qualities. The copolymer is crosslinked with carbon-carbon bonds between the polymer chains by using a peroxide to achieve the efficient crosslinking between the polymer chains.

An antioxidant and thermal stabilizer system compatible with peroxide crosslinking is also an important feature of the invention and exhibits a synergistic protection from thermal degradation. The ingredients of the antioxidant and thermal stabilizer system are a sterically hindered phenol, metal salts of dithiocarbamate and a coagent for peroxide crosslinking. This system not only appears to aid in the peroxide crosslinking but also produces an effective thermal stability under extreme conditions. The composition can also contains certain effective amounts of thermal stabilizers such as metallic oxides.

The carbon black used in the composition contributes to the reinforcement and toughening of the base copolymer. However, the combination of a high particle size and a low particle size carbon black gives the thermal stability of the composition in a manner that is unusual and not attainable with a single grade of carbon black. The mixture of carbon blacks gives reinforcement typical of carbon blacks, but also antioxidant qualities attributed to the large particle size carbon black.

The composition of the invention is a copolymer rubber which can be prepared with variable viscosity. The composition can be prepared with a range of viscosity suitable for transfer molding of products. Raising the ethylene percentage of the copolymer increases the viscosity and produces a harder rubber which could be used for compression molding for a product which needs less elasticity. Another significant advantage to the other ethylene propylene compositions is that it contains no process oils. Therefore, it can be used in transfer molding without the oil additives which harden or age by the process of volatilization or extraction of oil from the compound.

This invention provides a rubber for geothermal uses that has an antioxidant level superior to prior geothermal products.

The compound of this invention can be molded into pipe protectors, seals or any other rubber parts needed in geothermal applications. The useful life of the material exceeds prior reported compositions.

DESCRIPTION OF PREFERRED EMBODIMENT

The copolymer of this invention is an ethylene and propylene type which is a peroxide curable rubber. There are various types and grades of ethylene and propylene copolymer. The percentage of ethylene is dependent on the product manufacturing method that will be used. The higher the ethylene content, the higher the viscosity of the composition before curing, and the harder and less elastic for the end product. For transfer molding which generally requires a viscosity ML of between 6 and 12, a copolymer of 40±5% ethylene and 60±5% propylene is suitable. Raising the ethylene content beyond 45% makes the uncured rubber too viscous for ordinary transfer molding, but compression molding or other alternative manufacturing processes could be used.

A preferred copolymer for use in the present invention for use with transfer molding is Vistalon 404 which is a broad molecular weight distribution copolymer which cannot be sulfur crosslinked. The copolymer has excellent thermal stability and can be used on normal rubber processing equipment. Typical raw polymer properties for Vistalon 404 are set forth in Table I below.

TABLE I

| | |
|---|---|
| Specific Gravity | 0.86 |
| Mooney Viscosity ML 1 + 8 212° F. | 35–45 |
| Vanadium Content | 50 ppm maximum |
| Ash | 0.1% by weight maximum |
| Volatiles | 0.5% |
| Diene Content | 0.0 |
| Typical Ethylene Content | 40% by weight |

Vistalon 404 is a copolymer which has been developed by Exxon Chemical Americas, designed specifically for electrical insulation and jacketing. The products have high heat resistance, good electrical properties, ozone and weather resistance, and excellent chemical resistance. There is no report in the available literature of the use of Vistalon 404 in drilling or geothermal type applications.

A synergistic system of antioxidants and a coagent produces an unusually stable compolymer when subjected to the extremes of geothermal type service. The synergistic system is composed of a sterically hindered phenol, salts of dithiocarbamate and a phenyleneimide. A preferred sterically hindered phelnol is tetrakis [methylene 3-(3',5'-di-tert-butyl-4'-hydroxyphenyl) proprionate] methane which is commercially available as an antioxidant Irganox 1010 a Ciba-Geigy product. The sterically hindered phenol antioxidant is from about 0.5 to about 8 parts per weight of copolymer in the initial mixture.

The other antioxidants of the system are metal salts of dithiocarbamate. The metal salts can be any of the following in effective amounts: Nickel dimethyldithiocarbamate, nickel di-isobutyldithiocarbamate. bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium diethyldithiocarbamate, selenium dimethyldithiocarbamate, tellurium diethyldithiocarbamate, zinc diamyldithiocarbamate, zinc diethyldithiocarbamate, zinc dimethyldithiocarbamate, potassium dibutyldithiocarbamate, sodium dibutyldithiocarbamate, sodium cyclohexylethyl-dithiocarbamate, zinc dibenzyldithiocarbamate. Preferred metal salts of dithiocarbonate are nickel dimethyldithiocarbamate and nickel di-isobutyldithiocarbamate which are used in the composition from about 1 to about 3 parts per weight of copolymer. The amount of the two nickel dithiocarbamate antioxidants can be varied within the ranges stated independently of the other. The nickel antioxidants are available commercially as Methyl Niclate and Isobutyl Niclate tradename products sold by R. T. Vanderbilt. These compounds are recognized as antioxidants for products with peroxide crosslinking. The nickel salts are preferable because they do not accelerate vulcanization. The use of two nickel dithiocarbamates together increases the amount of dithiocarbamate in the compound because the solubility of one could be exceeded without achieving the desired level of dithiocarbamate in the composition for an effective level for the geothermal type conditions.

The other chemical in the synergistic system is a coagent. A preferred compound is N,N'-m-phenylene dimaleimide used in about 0.5 to 2.0 parts per weight of copolymer. This is commercially available under the trademark HVA-2, a DuPont product. The chemical apparently aids the rate and efficiency of peroxide crosslinking as well as being a thermal stabilizer. When HVA-2, is used with the antioxidants in the composition an unusual thermal stability is evidenced by the products manufactured with the composition.

Another feature of the composition is the use of two grades of carbon black which when used in combination provide not only a reinforcement and toughening but also an antioxidant and thermal stability property that is unusual for carbon black. The preferred carbon blacks are per ASTM D1765 N330 (Generic) and N990 carbon black, a Huber brand. Other carbon blacks may be substituted for the N330 which are of a particle size smaller than N990. The properties of the carbon blacks are set forth in Table II below.

TABLE II

| Properties | N330 | N990 |
| --- | --- | --- |
| Particle size | 26–30 nm | 201–500 nm |
| DBP absorption No. | 102 | 40 |
| $I_2$ | 82 | — |

The N330 and N990 carbon blacks are used individually in about 25 to 100 parts per weight of copolymer. The amounts of the two grades of carbon blacks within the range stated are not mutually dependent, however a mixture of the two within the ranges is necessary to provide the unusual thermal stability.

As previously discussed, the composition after curing contains carbon/carbon crosslinkage brought about by a peroxide curing agent which has been dispersed in an elastomer for safer and easier handling. A number of commercially available products could be used to produce the peroxide crosslinkage. The peroxide product used depends on the efficiency of crosslinkage desired. A preferred peroxide cure is E(VC)D-40 a Wyrough & Loser product which is 40% VUL-CUP R [α,α'bis(t-butylperoxy) diisopropylbenzene)] dispersed in 60% ethylene propylene rubber. VUL-CUP R is a Hercules product. The E(VC)D-40 is a very efficient peroxide to produce the cure state for the copolymer of the composition. The peroxide curing agent is used in about 6 to about 14 parts per weight of copolymer in the initial mixture.

In addition to the foregoing chemicals, other additives may be included. Various metallic oxides can be used in affective amounts as additional thermal stabilizers. The metallic oxides can be zinc oxide, magnesium oxide, cadmium oxide or oxides of lead. One of the metallic oxides selected for use in this invention is Zic Stik 85, a 90±2% zinc oxide in a proprietary binder marketed by Wyrough & Loser. Any number of other commercially available metallic oxides could be used. In this composition the metallic oxide is used in 0 to about 30 parts per weight of copolymer in the initial mixture.

Other additions such as process aids and lubricants can be used in effective quantities to produce the composition which can be handled, cured, and molded in a commercially feasible manner.

The composition is prepared in commercial internal mixing equipment which is cooled in the temperature range of about 55° F. during mixing to prevent premature curing of the copolymer prior to transfer to the desired molds. The copolymer and metallic oxide, if any is used, is mixed for about two minutes. Then about one-fourth of the lower particle size carbon black and the sterically hindered phenol antioxidant is added and mixed for about one minute. Then the metal salts of dithiocarbamates are added with about one-fourth of the lower particle size carbon black and the coagent for about another minute. The next addition to the mixture is the remainder of the low particle size carbon black and processing aids may be added with mixing for one minute. Then the N990 carbon black is added. At the point of the addition of the N990 carbon black, about five minutes of mixing time has elapsed.

The peroxide is added after the mixture is thoroughly combined, which is about two minutes after the addition of the N990 carbon black. The peroxide is mixed for about a minute. The times and duration of mixing periods are intended to be guidelines and can vary depending on the equipment used and amount of copolymer mixed. Also, the order in which the ingredients are added are not critical with the exception of the peroxide. The peroxide increases the heat of the mixture as it starts the cure and is usually added last to prevent premature curing. After the peroxide has been added the temperature of the composition should be approximately 190° F. to 200° F. and should not exceed 225° F. The rubber before curing to be used in a transfer mold product should be of a suitable viscosity for the manufacturing procedure. Rubber which is too viscous for transfer molding can be used in compression molding and other fabrication.

After the composition is transferred to the mold of the desired product, the rubber is cured at a temperature from 300° to 360° F. At 310° F., the optimum time for curing is about one hour and fifteen minutes for a molded pipe protector. The time for curing goes down as the temperature is increased. There are other factors affecting the cure time and temperature which depend on the configuration of the molding apparatus used. For instance certain molds will necessitate a low temperature and longer time period to prevent overcuring. The molds are usually preheated to about 300° F. and are heated and put under about 500 psi to about 2000 psi pressure by a ram press during curing. The transfer molded products are usually cooled in ambient air after curing.

The cure time and temperature is also dependent on the peroxide cure of this composition. The peroxide is the active agent by extracting a hydrogen from a carbon hydrogen bond and creating a free radial on the carbon chain during curing. The carbon atom free radicals on the polymer chain form the backbone to backbone crosslinks. It is desired to use up all the highly active peroxide in the curing process and not have any excess peroxide left in the rubber. Since peroxide has a normal half life, the cure time can be calculated at a point when about 99% of the peroxide is broken down. The crosslinkage in curing is relative to the peroxide breakdown such that peroxide breakdown and cure time can be measured by normal rheometer tests in the laboratory and scale up for commercial applications.

The composition can be used effectively for many types of geothermal rubber product applications. The products include rubber valve parts, including seals previously made of rubber of the L'Garde type or other types of rubber which would age and lose elastic characteristic. A higher ethylene content copolymer rubber could be used for compression molded parts such as packers. Also, the composition can be used for any molded pipe protector or stretch-on pipe protector for geothermal well pipe. A typical style pipe protector which can be used for geothermal services is a Bettis Stretch-On Protector which requires good elasticity to slip over pipe joints and tool joints larger than the internal diameter of the pipe protector.

The method for making a preferred composition of the invention which is suitable for commercially molded products is described and explained in the following example.

EXAMPLE 1

A conventional Banbury mixer for making rubber products was used. The mixer was set at 30 rpm and the ram was set at 50 psi. The water temperature of the jacket cooling the mixer is 55° F. 100 parts of Vistalon 404 with 10 parts per weight of Zic Stik 85 were mixed for about two minutes. Materials to be added are measured by parts per weight of the copolymer Vistalon 404 and include 4 parts Irganox 1010, 75 parts N330 carbon black, 25 parts N990 carbon black, 1 part T.E. 80 dlc, 0.5 parts HVA-2, 2 parts Methyl Niclate and 2 parts Isobutyl Niclate.

After about two minutes of mixing the Vistalon 404 and Zic Stik 85, 4 parts of Irganox 1010 is added with about one-fourth of the N330. About one minute later about one-fourth of the N330 is added with 0.5 parts HVA-2, 2 parts Methyl Niclate and 2 parts Isobutyl Niclate and mixed for about one minute. Then the balance of the N330 is added and 1 part T.E. 80 dlc is mixed for about one minute. Next 25 parts of N990 is added with the mixing continuing for about another two minutes. At this point seven minutes of mixing time has elapsed. 11 parts of E(VC)D-40 is added and the temperature is approximately 180° F. The mixing continues for about one minute longer with the temperature of the mixture rising to about 190° F.–200° F. After milling preparation the mixture is ready for use in transfer molds.

The properties of this example of the composition cure as indicated are set forth in TABLE III below.

TABLE III

| | |
|---|---|
| ML ASTM D (2084) (at 300° F.) | 11 |
| MH ASTM D (2084) (at 300° F.) | 38 |
| Properties with 99% Cure Time at 300° F. (164 minutes) | |
| Tensile Strength ASTM D 412 | 1850 psi |
| $M_{100}$ | 745 psi |
| Elongation at Break (%) | 190 |
| Tear Strength ASTM D 624 (die C test) | 130 |
| Durometer Hardness ASTM D 2240 | 73 |
| Properties with 90% Cure (82 minutes) + 2 hours in Oven at 400° F. | |
| Tensile Strength ASTM D 412 | 1825 psi |
| $M_{100}$ | 625 psi |
| Elongation at Break (%) | 220 |
| Tear Strength ASTM D 624 (die C test) | 135 |
| Durometer Hardness ASTM D 2240 | 73 |

This rubber composition was tested for certain properties after being subjected to conditions which would include high heat and/or steam. Samples were placed in an autoclave at about 45 psi to 50 psi in steam at 290° F. The samples were in water soluble drilling mud at 10 pounds per gallon. The samples were held for 10 days in this environment and tested for tensile strength and other properties. Table IV shows the results compared with the properties reported in Table III Properties with 99% Cure Time at 300° F.

TABLE IV

| | |
|---|---|
| Tensile Strength ASTM D 412 | No data |
| $M_{100}$ | +19% |

TABLE IV-continued

| | |
|---|---|
| Elongation at Break | −18% |
| Tear Strength ASTM D 624 (die C test) | +1% |
| Durometer Hardness ASTM D 2240 | +3 |

The samples of this embodiment were also subjected to dry air oven aging with no steam. The following results in Table V were also compared with the properties reported in Table III Properties with 99% Cure Time at 300° F.

TABLE V

| Oven Drying at 392° F. | | |
|---|---|---|
| | 24 hours | 48 hours |
| Tensile Strength ASTM D 412 | No data | No data |
| $M_{100}$ | +32% | 0% |
| Elongation at Break | −32% | −72% |
| Tear Strength ASTM D 624 (die C test) | +20% | +17% |
| Durometer Hardness ASTM D 2240 | +11 | +13 |

EXAMPLE 2

Using the equipment and procedures explained in Example 1 the following starting materials were mixed in parts per weight based on 93 parts of copolymer as shown in Table VI below.

TABLE VI

| STARTING MATERIAL | PARTS |
|---|---|
| Vistalon 404 | 93 |
| Irganox 1010 | 4 |
| Zic Stik 85 | 10 |
| Methyl Niclate | 2 |
| Isobutyl Niclate | 2 |
| HVA-2 | 0.5 |
| N990 | 50 |
| N330 | 70 |
| E(VC)D40 | 12 |

This formula gives a rubber with suitable viscosity for transfer molding. The properties are essentially the same as those reported for Example 1.

EXAMPLE 3

Using the equipment and procedures explained in Example 1 the following embodiment has a starting material copolymer of 55±5% ethylene and 45%±5% propylene which gives a tougher rubber due to the higher ethylene content. The copolymer is commercially available under the trademark EPsyn 4006 by Copolymer Rubber & Chemical Corp. of Baton Rouge, La. The mixing ratio based on 93 parts of copolymer is in Table VIII below.

TABLE VII

| STARTING MATERIAL | PARTS PER WEIGHT |
|---|---|
| EPsyn 4006 | 93 |
| Irganox 1010 | 4 |
| Methyl Niclate | 2 |
| Isobutyl Niclate | 2 |
| Zic Stik 85 | 10 |
| N990 | 50 |
| N330 | 50 |
| HVA-2 | 0.5 |
| E(VC)D40 | 12 |

The properties tested for this formulation are shown in Table VIII.

TABLE VIII

Properties with 99% Cure Time at 320° F. (83 minutes)

TABLE VIII-continued

| | |
|---|---|
| ML ASTM D (2084) | 21 |
| MH ASTM D (2084) | 136 |
| Tensile Strength ASTM D 412 | 1940 psi |
| $M_{50}$ | 405 psi |
| $M_{100}$ | 1025 psi |
| Elongation at Break (%) | 155 |
| Tear Strength ASTM D 624 (die C test) | 110 |
| Durometer | 75 |
| Properties with 99% Cure Time at 340° F. (26.5 minutes) | |
| ML ASTM D (2084) | 20 |
| MH ASTM D (2084) | 128 |
| Properties with Original Cure for 83 minutes at 320° F. and Post Cure in Oven 4 hours at 350° F. | |
| Tensile Strength ASTM D 412 | 2430 psi |
| $M_{50}$ | 480 psi |
| $M_{100}$ | 1185 psi |
| Elongation at Break (%) | 160 |
| Tear Strength ASTM D 624 (die C test) | 135 |
| Durometer Hardness ASTM D 2240 | 77 |

EXAMPLE 4

The following example uses a mixture of commercially available ethylene propylene copolymer to vary the ethylene content and properties of the rubber. The Vistalon 404 is mixed with Vistalon 707 which has a higher ethylene content, both Vistalon products are by Exxon Chemical Americas. The ingredients in Table IX are mixed as previously described in Example 1 and are based on 65 parts per weight of Vistalon 404.

TABLE IX

| STARTING MATERIAL | PARTS |
|---|---|
| Vistalon 404 | 65 |
| Vistalon 707 | 28 |
| Irganox 1010 | 4 |
| Methyl Niclate | 2 |
| Isobutyl Niclate | 2 |
| Zic Stik 85 | 10 |
| N330 | 50 |
| N990 | 50 |
| HVA-2 | 0.5 |
| E(VC)D40 | 12 |

The properties for this embodiment of geothermal rubber are shown in Table X.

TABLE X

| | |
|---|---|
| Properties with 99% Cure Time at 340° F. (25 minutes) | |
| ML ASTM D (2084) | 15 |
| MH ASTM D (2084) | 82 |
| Tensile Strength ASTM D 412 | 1725 psi |
| $M_{25}$ | 250 psi |
| $M_{50}$ | 360 psi |
| $M_{100}$ | 690 psi |
| Elongation at Break (%) | 200 |
| Tear Strength ASTM D 624 (die C test) | 125 |
| Durometer ASTM D 2240 | 79 |
| Mooney Viscosity ASTM D 1646 at 275° F. | 54 points |
| $T_5$ (5 point increase in Mooney Viscosity number) | 4.45 minutes |
| $T_{35}$ (5 point increase in Mooney Viscosity number) | 6.85 minutes |
| Properties with 99% Cure Time at 340° F. (25 minutes) and Post Cure in Oven 4 hours at 350° F. | |
| Tensile Strength ASTM D 412 | 1780 psi |
| $M_{25}$ | 275 psi |
| $M_{50}$ | 385 psi |
| $M_{100}$ | 730 psi |
| Elongation at Break | 200% |
| Tear Strength ASTM D 624 (die C test) | 140 |
| Durometer ASTM D 2240 | 82 |

What is claimed is:

1. A rubber composition comprising a peroxide crosslinked ethylene propylene compolymer; an effective amount of metal salts of dithiocarbamate; an effective amount of sterically hindered phenol; minor effective amounts of coagent to peroxide crosslinking; a mixture of carbon black of a particle size of about 201 to about 500 nm and of a particle size less than about 201 nm wherein the carbon blacks are used individually in about 25 to 100 parts per weight of copolymer.

2. A rubber composition of claim 1 wherein said peroxide crosslinked ethylene propylene copolymer is comprised of about 35% to about 45% ethylene and about 55% to about 65% propylene.

3. A rubber composition of claim 1 wherein said metal salts of dithiocarbamate are chosen from a group consisting essentially of nickel dimethyldithiocarbamate, nickel di-isobutyldithiocarbamate, bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium diethyldithiocarbamate, selenium dimethyldithiocarbamate, tellurium diethyldithiocarbamate, zinc diamyldithiocarbamate, zinc diethyldithiocarbamate, zinc dimethyldithiocarbamate, potassium dibutyldithiocarbamate, sodium dibutyldithiocarbamate, sodium cyclohexylethyl dithiocarbamate, zinc dibenzyldithiocarbamate.

4. A rubber composition of claim 1 wherein said sterically hindered phenol is tetrakis [methylene 3-(3',5'-di-tert-butyl-4'-hydroxyphenyl) proprionate] methane.

5. A rubber composition of claim 1 wherein said coagent to peroxide crosslinking is N,N'-m-phenylene diamaleimide.

6. A rubber composition of claim 1 wherein said carbon black of a particle size less than 201 nm is ASTM N330 carbon black of particle size of about 26 nm to about 30 nm.

7. A rubber composition of claim 1 wherein said sterically hindered phenol is about 0.5 to about 8.0 parts per hundred weight of copolymer.

8. A rubber composition of claim 3 wherein said metal salts of dithiocarbamate are from about 1.0 to about 3.0 parts per hundred weight of compolymer.

9. A rubber composition of claim 1 wherein said coagent to crosslinking is about 0.5 to about 2.0 parts per hundred weight of copolymer.

10. A rubber composition of claim 1 including a metallic oxide.

11. A rubber composition of claim 10 wherein said metallic oxide is zinc oxide.

12. A rubber composition of claim 3 wherein said metal salts of diothiocarbamate are nickel dimethyldithiocarbamate in about 1.0 to about 3.0 parts per hundred weight of copolymer and nickel di-isobutyldithiocarbamate in about 1.0 to about 3.0 parts per hundred weight of copolymer.

13. A rubber composition of claim 1 including a lubricant process aid.

14. A rubber composition of claim 1 wherein said mixture of carbon black is about 25 to about 100 parts per weight of copolymer of particle size 201–500 nm and about 25 to about 100 parts per weight of compolymer of particle size 26–30 nm wherein the carbon blacks are used individually in about 25 to 100 parts per weight of copolymer.

15. A drill pipe protector comprised of a rubber composition of a peroxide crosslinked ethylene propylene copolymer; an effective amount of metal salts of dithiocarbamate; an effective amount of sterically hindered phenol; minor effective amounts of coagent to peroxide crosslinking; a mixture of carbon black of a particle size of about 201 to about 500 nm and of a particle size of less than about 201 nm wherein the carbon blacks are used individually in about 25 to 100 parts per weight of copolymer.

16. A valve seal for geothermal useage comprised of a rubber composition of a peroxide crosslinked ethylene propylene copolymer; an effective amount of metal salts of dithiocarbamate; an effective amount of sterically hindered phenol; minor effective amounts of coagent to peroxide crosslinking; a mixture of carbon black of a particle size of about 201 to about 500 nm and of a particle size of less than about 201 nm.

* * * * *

UNITED STATES PATENT AND TRADEMARK OFFICE
CERTIFICATE OF CORRECTION

PATENT NO. : 4,575,522

DATED : March 11, 1986

INVENTOR(S) : William D. Breach, Edwin W. Vaclavik

It is certified that error appears in the above-identified patent and that said Letters Patent are hereby corrected as shown below:

Column 10, line 7, change "compolymer" to -- copolymer --.

Column 10, line 13, change "the" to -- said --.

Column 10, line 68, cancel beginning with "wherein the carbon" to and including "weight of copolymer" in Column 11, line 2.

Column 11, line 11, change "the" to -- said --.

Column 12, line 10, after "about 201 nm" insert the following -- wherein said carbon blacks are used individually in about 25 to 100 parts per weight of copolymer --.

Signed and Sealed this

Third Day of February, 1987

Attest:

DONALD J. QUIGG

Attesting Officer

Commissioner of Patents and Trademarks